Nov. 12, 1940.  O. L. RAILSBACK  2,221,523
PITCH DETERMINING APPARATUS
Filed March 17, 1938  2 Sheets-Sheet 1

INVENTOR.
ORA L. RAILSBACK
BY
McConkey, Dawson & Booth
ATTORNEYS

Nov. 12, 1940.  O. L. RAILSBACK  2,221,523
PITCH DETERMINING APPARATUS
Filed March 17, 1938   2 Sheets-Sheet 2

INVENTOR.
ORA L. RAILSBACK
BY McConkey, Dawson+Booth
ATTORNEYS.

Patented Nov. 12, 1940

2,221,523

UNITED STATES PATENT OFFICE 2,221,523

PITCH DETERMINING APPARATUS

Ora L. Railsback, Charleston, Ill.

Application March 17, 1938, Serial No. 196,373

23 Claims. (Cl. 181—0.5)

This invention relates to the determination of the pitch of sounds, and especially of musical tones, by measurement of their vibration frequencies.

Heretofore stroboscopic devices have been used to indicate the approximate pitch of sounds, by estimating with the use of such means the difference between the vibration frequency being measured and a standard frequency. The devices heretofore proposed, however, did not permit of accurate and at the same time convenient measurement of the difference between the known and unknown frequencies, and were so complicated and bulky, and required so much time and care in their operation, that they have never come into general use, as for example in tuning musical instruments.

An object of the invention is to provide simple, reliable and compact apparatus which is easily and quickly operable and which permits very exact convenient and accurate determination of frequencies (as for example those corresponding to the various notes of a musical instrument). Preferably the determination is made by accurately measuring the variation of a standard known frequency necessary to make it synchronize stroboscopically with the unknown frequency.

In the apparatus illustrated, the determination is made by illuminating a patterned disk rotating at a known speed by means of a neon lamp or the like energized intermittently at a frequency corresponding to that of the note being checked. An important object of the invention is to provide for energizing such a lamp, in the described apparatus, at the frequency of this note but with an intensity which is constant and which is independent of the volume of the sound.

Another feature of the invention relates to securing clear definition of the pattern of the rotating disk or its equivalent, by limiting sharply the duration of the light impulses corresponding to the sound frequency.

One form of apparatus which may be used is shown in the attached drawings, and one method of determining frequencies therewith is described below. Various features and advantages of the invention will be apparent as the description proceeds. In the drawings.

Figure 1:
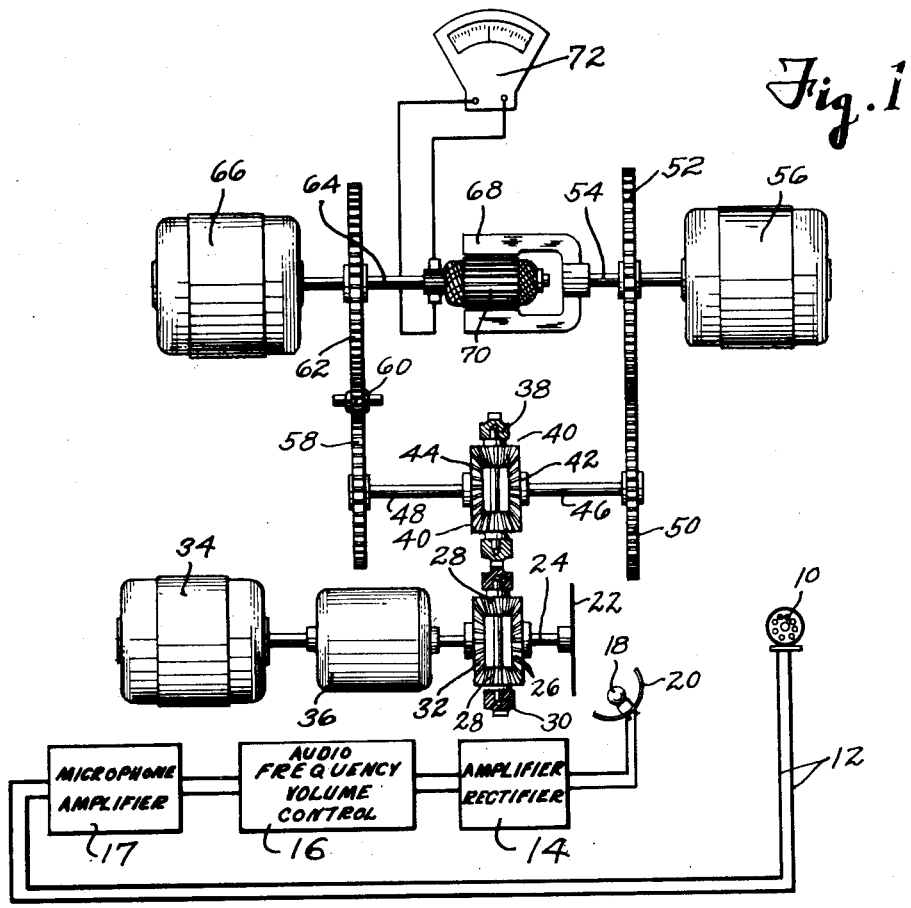
Figure 1 is a diagrammatic plan view of the apparatus when in use.

In general, the apparatus may be assembled in two parts. One part includes a microphone 10 which picks up the tone whose pitch is to be determined, and which is connected by wires 12 to an audio-frequency electronic type amplifier 17 of any desired type, and thence through an automatic audio volume control 16 and an amplifier rectifier 14, both further described below. The amplifier rectifier 14 is connected to gaseous-discharge lamp such as a neon lamp or a plurality of neon lamps 18, which may be backed up by a reflector 20. When this circuit is properly adjusted, the lamp 18 will be energized (i. e. the light will be turned on and off) in synchronism with the vibration frequency of the tone picked up by the microphone 10.

Figure 2:
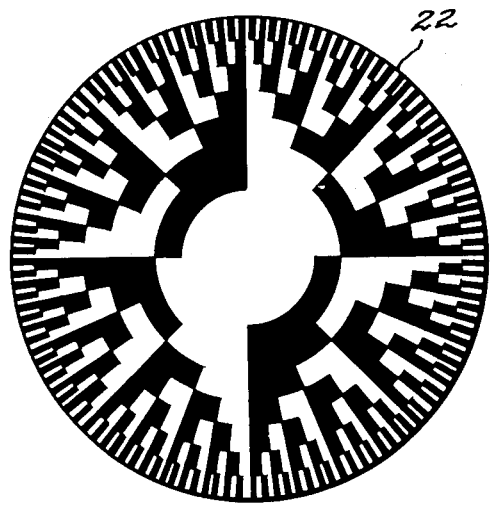
Figure 2 is a front elevation of a stroboscopic disk used in the apparatus.
Figure 3:
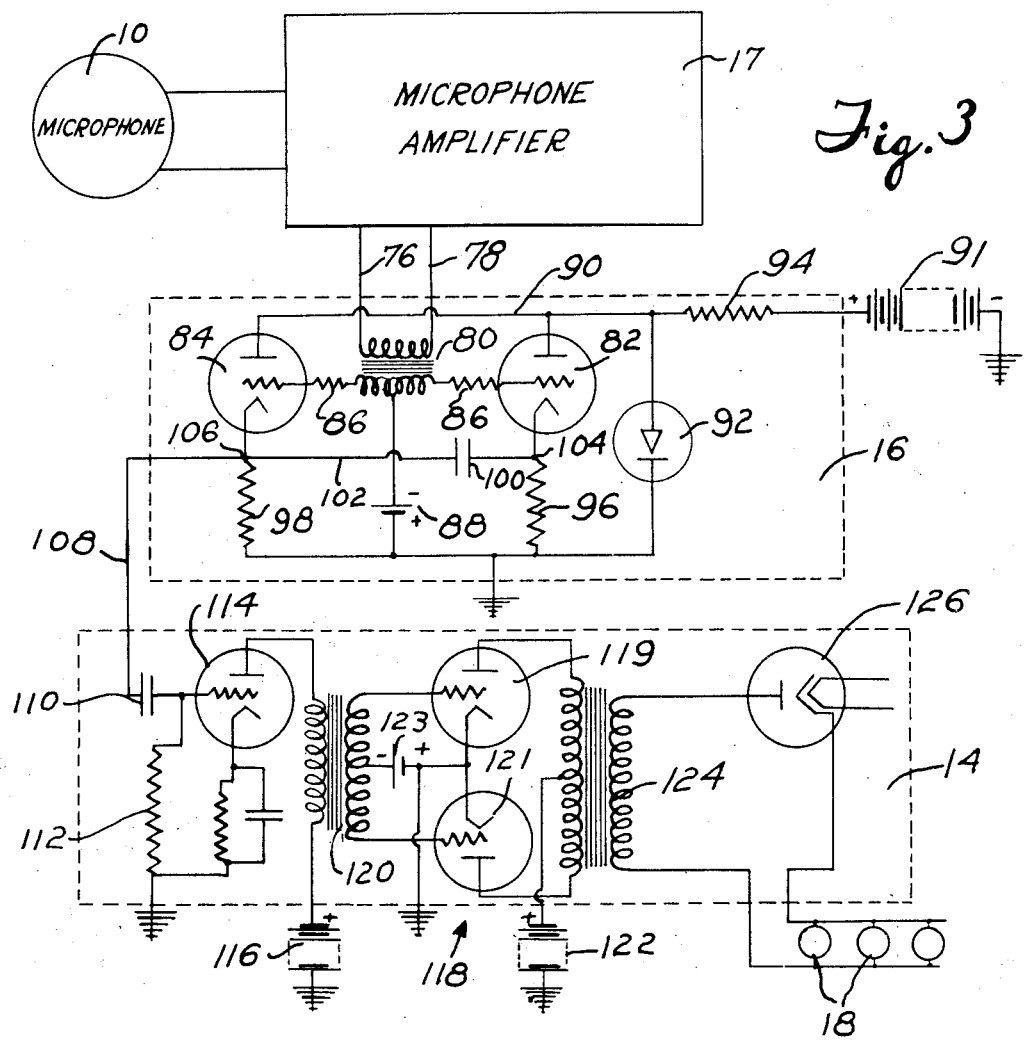
Figure 3 is a wiring diagram.

The intermittent light so produced, having the same frequency that is to be measured, is arranged to illuminate a stroboscopic member such as a disk 22 printed with suitable pattern. Preferably the pattern consists, as shown in Figure 2, of a series of concentric circular zones (for example seven zones corresponding to the seven complete octaves of a piano keyboard); each zone is equally subdivided into alternate light and dark segments, the number of segments in each zone being double the number in the next inner zone, the segments of each zone being continued radially outward with half the width, to form alternate segments of the next outer zone. Thus one such disk, when driven at such a speed that the innermost zone has a frequency corresponding to one of the notes of the lowest octave on the keyboard, can be used for comparing tones of unknown frequency stroboscopically with that note and its six octaves higher up the keyboard.

In the particular apparatus illustrated, the disk 22, or an equivalent stroboscopic member, is mounted on a shaft 24 driven by the driven gear 26 of a differential. The gear 26 is connected by pinions 28 on a ring gear 30 to a driving gear 32. The gears 26, 28, 30 and 32 make up a mechanical differential of a well-known type, but obviously their places can be taken by the corresponding parts of a differential of any other type.

The gear 32 is driven by a constant speed motor 34, which may be a synchronous motor, and which is connected to the driving gear 32 through a change-speed transmission 36. The transmission 36 may be of any desired type, but preferably has enough different speeds so that a speed for the disk 22 may be selected which is quite close to the correct speed for synchronizing with the vibration frequency of the light 18 being determined.

In one arrangement which I have used, there are twenty-one equally-stepped speeds, with the highest double the lowest, so that a speed for disk 22 may be selected which corresponds approximately to the vibration frequency. This permits the adjustment described below to operate through a very narrow range as compared to the speed of the disk 22, thus facilitating accuracy both of adjustment and of reading the indication of the adjustment, since the full range of the adjustment can be used for variations in speed corresponding to differences in frequency corresponding to one of these steps.

The ring gear 30 meshes with the ring gear 38 of a second differential forming part of the speed adjustment of the apparatus. The ring gear 38 carries pinions 40 meshing with two oppositely-rotating driving gears 42 and 44 on shafts 46 and 48. The shaft 46 is driven in one direction by a gear 50 directly meshing with a gear 52 on the armature shaft 54 of a variable speed motor 56. The shaft 48 is driven in the opposite direction by a gear 58 meshing with an idler gear 60 driven by a gear 62 on the armature shaft 64 of a variable speed motor 66.

The sizes of the gears 50, 52, 58, 60, 62 are such that when motors 56 and 66 are running at the same speed the gears 42 and 44 are driven at the same speed and in opposite directions, thus holding the ring gear 38 stationery. The disk 22 then runs at a speed determined by the speed of the motor 34 and the setting of the transmission 36.

If the speed of either of the motors 56 or 66 is varied, ring gear 38 is driven in one direction or the other, and drives the ring gear 30 at the same speed but in the opposite direction. This turning of the ring gear 30 acts by the well-known action of the differential to compound itself additively or subtractively with the speed of the gear 32 in driving the gear 26 and the disk 22.

It will be noted that the shafts 54 and 64 turn in the same direction. As a convenient means of accurately indicating visually the variation in the speed of the disk 22, I provide an electrical indicator, shown diagrammatically as a small generator having a field 68 driven by the shaft 54 and an armature 70 driven by the shaft 64. The generator so diagrammatically indicated may be connected to a meter 72 measuring the voltage generated.

When the shafts 54 and 64 are running at the same speed, meter 72 will be at zero. Increase of speed of the motor 56 or decrease of speed of the motor 66 will cause deflection of the indicator needle of the meter 72 in one direction from zero, while decrease of speed of motor 56 or increase of speed of the motor 66 will cause deflection of the indicator needle in the other direction from zero. The scale of the meter 72 may, for example, be calibrated and graduated directly in revolutions per minute added or subtracted to the speed of the gear 32.

In operation, with all three motors running, a tone is sounded near the microphone 10, to cause intermittent energization of the lamp 18, and the transmission 36 is shifted to a speed believed to approximate that corresponding to the tone being sounded. Assuming that a position of the transmission closest to that corresponding to the tone being sounded is found, one of the patterns of one of the zones on the disk 22 will either appear stationary, or will appear to turn forward or backward.

If the pattern appears stationary, the vibration frequency being determined is known to be the same as the one for that zone and speed of the disk, and this standard frequency of course is known. If the pattern seems to turn slowly, the note is either flat or sharp (depending on which way it seems to turn), and it is then possible to calculate accurately how much (for example in hundredths of a semitone or "cents") it is flat or sharp, by varying the speed of one or both of the motors 56 or 66 and calculating the pitch from the result shown on the meter 72.

Now to go back and describe the manner in which the volume control 16 and the amplifier rectifier 14 operate to give sharply defined light impulses of uniform intensity, the output of the microphone 10 is amplified in an audio frequency amplifier 17 of any desired kind. The output from this amplifier is conducted by lines 76 and 78 to the primary of a transformer 80 the secondary of which has each terminal connected to the grid of one of a pair of thyratron tubes 82 and 84. A current limiting resistance 86 is interposed in each connection. The negative terminal of a C battery or similar source of voltage 88 is connected to a center tap of the transformer 80, as shown, to provide a grid bias to prevent the thyratrons from passing any current. The other end of the C battery is connected to ground.

The plates of the thyratrons are each supplied by a line 90 with a constant positive potential, e. g. by a 90 volt B battery 91. Any source may be employed and it may be regulated by a voltage control tube 92 and resistance 94 in the usual manner. The negative terminal of the B battery 91 is shown connected to ground.

The filaments (the heating arrangement thereof not being shown) of the thyratrons 82 and 84 are connected in series with resistances 96 and 98 respectively and with ground. A condenser 100 is connected in a line 102 between the high voltage sides of the resistances.

Operation of this portion of the circuit which I have designated the audio frequency volume control is as follows:

A thyratron is a tube which passes a constant current when energized regardless of fluctuations of the grid voltage. The passage of current can only be stopped by a voltage applied across the plate and the filament. The grid bias will prevent discharge once the flow of current through the tube is stopped.

The microphone amplifier delivers an alternating current to the transformer 80. On one half wave this current induces a voltage in the secondary of the transformer 80 which opposes the grid bias of one of the thyratrons e. g. 82. The reduction or reversal of the grid voltage which results from this starts a current through the thyratron which is entirely independent in amount of that flowing from the amplifier. This current flows to ground through resistance 96 causing a large voltage drop thereacross.

On the next half wave of current coming from the amplifier 74 the voltage induced in the secondary of transformer 80 is reversed and therefore counteracts the grid bias of the thyraton 84 causing it to discharge a current to ground and create a large voltage drop across the resistance 98.

As the current starts in resistance 98 some current also flows momentarily through the parallel circuit 102, condenser 100 and resistance 96 consequently impressing a positive voltage at the point 104. The system is so constructed that this increase of voltage is enough so that the total voltage at 104 is greater than that applied to the plate of tube 82 and this tube ceases to discharge and remains inactive after the voltage at point 104 is overcome, because the bias voltage on the grid is high.

On the next half wave, tube 82 starts again and it acts to stop the tube 84 in the same manner by momentarily increasing the voltage at the point 106.

Consequently at points in the system such as 106 there are voltage impulses of constant amplitude and of a frequency corresponding to the frequency of the sound impinging on the microphone 10.

These impulses are tapped off by a line 108 containing a coupling condenser 110 to the amplifier-rectifier 14. This line is grounded through a resistance 112 and is connected ahead of this resistance to the grid of a vacuum tube 114 so that the voltage impulses at the point 106 actuate this tube.

The plate of tube 114 is supplied with a positive voltage from some suitable source such as B battery the negative terminal of which is connected to ground. The output of the tube 116 is transmitted to a push-pull amplifier unit 118 through a transformer 120.

The end terminals of the secondary of the transformer 120 are connected to the grid of two vacuum tubes 119 and 121 and the center tap of the transformer 120 is connected to the negative terminal of a source of electrical potential such as C battery 123, the negative of which is connected to ground and one terminal of the filaments of the vacuum tubes. The filaments of tubes 119 and 121 are connected to a source of electrical energy, not shown. The plates of the two vacuum tubes 119 and 121 of the push-pull unit are connected to the primary terminals of a transformer 124 and are supplied with a positive potential from a suitable source such as B battery 122, connected to the outer tap of transformer 124, the negative terminal of the B battery being connected to ground.

Therefore it can readily be seen, that the effects of the signal voltage on the grids of tubes 119 and 121 are additive in the output transformer 124. The output of the push pull amplifier is transmitted through the transformer 124 to a line containing in series a half wave rectifier tube 126 and the neon lights 18. Consequently only one half wave of the output of the push-pull amplifier unit is available to energize the neon lamps.

The light from the lamps will be uniform because the energization of the amplifiers is of constant amplitude.

Figure 4:
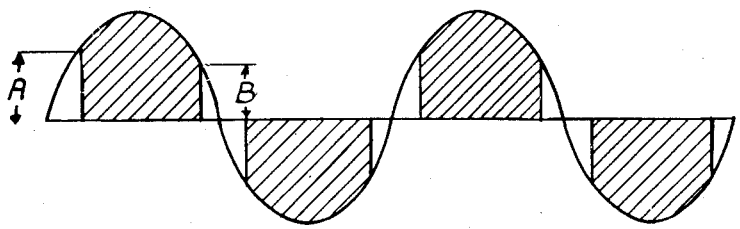
Figures 4 and 5 are diagrams illustrating the method of limiting the duration of the light impulses.
Figure 5:

The effect of the rectification is illustrated in Figures 4 and 5. Figure 4 shows the full-wave voltage put out by the transformer 124. A neon lamp has the characteristic of beginning to discharge when a certain voltage A is applied and ceasing to discharge when that voltage decreases below another value which we will designate B. The abscissas of the shaded areas of Fig. 4 therefore indicate the time when the lamps 18 would be illuminated. This shows that the lamp would flash at twice frequency of the current and, unless the peak voltage were substantially the same as the discharge voltage of the lamps, they would be on more than off, giving a blurred pattern.

Figure 5 illustrates the effect of eliminating one half wave by means of the rectifier.

While one particular apparatus and one manner of manipulating it, have been described in detail, it is not my intention to limit the scope of the invention by that description, or otherwise than by the terms of the appended claims. Some features of the invention are useful in cases where it is desired to utilize the known vibrational frequency of a sound, for example from a tuning fork, in determining the frequency of rotation of a shaft or the like, such as the shaft driving the gear 32, or some similar driving element.

I claim:

1. That method of determining the pitch of sounds which comprises turning a light on and off synchronously with the vibrations of the sound, illuminating with the intermittent light so produced a stroboscope member provided with an interrupted pattern which will appear stationary when the speed of the member synchronizes with the frequency of the intermittent light, driving said member by a device operating at a known speed, varying the speed of said member relatively to said known speed until the pattern appears stationary, and measuring the difference in the speeds of said device and stroboscopic member.

2. That method of comparing the vibration frequency of a sound with the frequency of a driving device (one of said frequencies being known) which comprises controlling the frequency of an intermittent light in synchronism with the sound vibrations, illuminating with the intermittent light so produced a stroboscopic member provided with a pattern which will appear stationary when the speed of the member synchronizes with the frequency of the light, driving the stroboscopic member from the driving device, compounding with the drive from said device a cooperating variable drive, adjusting said variable drive until the resultant speed is such that the pattern appears stationary, and determining the speed of the variable drive, whereby the unknown frequency can be determined from the known frequency.

3. Apparatus of the class described comprising, in combination with a light having connected thereto means for energizing the light intermittently at a frequency in synchronism with the vibration frequency of a sound whose pitch is to be determined, a patterned stroboscopic disk, driving means for said disk operating at a known speed such that the pattern on said disk will appear stationary if the light frequency corresponds to the driving speed of said means, means for varying the speed of said disk above and below the known speed, and means for indicating the variation of the disk speed from said known speed when synchronism of the light frequency with the operation of said disk is attained.

4. Apparatus of the class described comprising, in combination with a light having connected thereto means for energizing the light intermittently at a definite frequency, a patterned stroboscopic disk, driving means for said disk operating at a speed corresponding to a frequency approximating synchronism with said definite frequency so that the pattern on said disk will appear stationary if the light frequency synchronizes with the driving frequency, and will appear to turn forward or back if the two frequencies differ, means between the driving means and disk for varying the speed of said disk above and below the speed of the driving means within a narrow range, and means for indicating the variation of the disk speed from said driving means speed when synchronism of the light frequency with the operation of said disk is attained.

5. Apparatus of the class described comprising, in combination with a light having connected thereto means for energizing the light intermittently in synchronism with an unknown frequency to be determined, a patterned stroboscopic disk, means for driving said disk at a speed corresponding to a standard frequency approximating the unknown frequency so that the pattern on said disk will appear stationary if the light frequency is the same as the standard frequency, and will appear to turn forward or back if the two frequencies differ, a second and variable driving means, differential means connecting the two driving means to said disk, and means for indicating the speed of said variable driving means when the light frequency synchronizes with the operation of the disk so that the pattern on the disk appears stationary.

6. Apparatus of the class described comprising, in combination with a light having connected thereto means for energizing the light intermittently in synchronism with an unknown frequency to be determined, a patterned stroboscopic disk, means for driving said disk at a speed corresponding to a standard frequency approximating the unknown frequency so that the pattern on said disk will appear stationary if the light frequency is the same as the standard frequency, and will appear to turn forward or back if the two frequencies differ, a second and variable driving means, differential means connecting the two driving means to said disk, and which includes a normally stationary part which moves in proportion to the effect of the variable driving means on said disk, and an indicator connected to said part and operated thereby to show the variation of the first frequency from the standard frequency.

7. Apparatus comprising, in combination with a light having means for energizing it intermittently at an unknown frequency which is to be determined, stroboscopic means normally driven at a speed corresponding to a known standard frequency and including a part provided with a pattern which appears stationary when the unknown frequency synchronizes with said standard frequency, means for increasing or decreasing the speed by an increment which is small compared to said normal speed and which can be accurately controlled until said frequencies do so synchronize and said pattern does appear stationary, and an indicator actuated by said last means to show the difference between the unknown frequency and the standard frequency.

8. Apparatus comprising, in combination with a light having means for energizing it intermittently at an unknown frequency which is to be determined, stroboscopic means normally driven at a speed corresponding to a known standard frequency and including a part provided with a pattern which appears stationary when the unknown frequency synchronizes with said standard frequency, and means for increasing or decreasing the speed by a measured increment which is small compared to said normal speed and which can be accurately controlled until said frequencies do so synchronize and said pattern does appear stationary.

9. Apparatus comprising, in combination with a light having means for energizing it intermittently at an unknown frequency, stroboscopic means including a part provided with a pattern illuminated by said light and which appears stationary when its frequency is the same as that of the light, constant-speed driving means for operating the stroboscopic means so that said part is driven at a speed corresponding to a standard frequency, gearing interposed between said driving means and said stroboscopic means so that said pattern may be driven at speeds corresponding to any one of a series of standards differing by predetermined small amounts, and means for accelerating or slowing the speed of said part gradually over a range approximating said predetermined amount.

10. Apparatus comprising, in combination with a light having means for energizing it intermittently at an unknown frequency, stroboscopic means including a part provided with a pattern illuminated by said light and which appears stationary when its frequency is the same as that of the light, driving means for operating the stroboscopic means so that said part is normally driven at a speed corresponding to a standard frequency, gearing interposed between said driving means and said stroboscopic means, means for accelerating or slowing the speed of said part gradually over a comparatively small range, and means for accurately indicating the variation from normal speed to show the variation of the light frequency from the standard.

11. Apparatus comprising, in combination with a light having means for energizing it intermittently at an unknown frequency, stroboscopic means including a part provided with a pattern illuminated by said light and which appears stationary when the frequency is the same as that of the light, said pattern having subdivisions arranged in a series each corresponding to a frequency double that of the next lower, means for driving the stroboscopic means at a speed corresponding to a known standard frequency, said means comprising a motor and gearing connected to the stroboscopic means, and means for acting on the driving means to increase or decrease the speed of the stroboscopic means through a range which is small as compared to the normal speed.

12. Apparatus comprising, in combination with a light having means for energizing it intermittently at an unknown frequency, stroboscopic means including a part provided with a pattern illuminated by said light and which appears stationary when the frequency is the same as that of the light, said pattern having subdivisions arranged in a series each corresponding to a frequency double that of the next lower, means for driving the stroboscopic means at a speed corresponding to a known standard frequency, said means comprising a motor and gearing connected to the stroboscopic means, means for acting on the driving means to increase or decrease the speed of the stroboscopic means through a range which is small as compared to the normal speed, and an indicator connected to show the increase or decrease of speed in terms of variation of said unknown frequency from the standard frequency.

13. That method of checking the pitch of sounds which comprises converting sound vibrations into a varying alternating electric current of the same frequency, converting said current into a current of constant effective amplitude with the same frequency, suppressing one half of each wave of said second current, utilizing the constant-amplitude intermittent current at said frequency so formed to energize a source of light to give sharply-defined light impulses at said frequency, and utilizing said impulses to illuminate a stroboscopic device.

14. That method of checking the pitch of sounds which comprises converting sound vibrations into a varying alternating electric current of the same frequency, converting said current into a current of constant effective amplitude with the same frequency, suppressing one half of each wave of said second current, utilizing the constant-amplitude intermittent current at said frequency so formed to energize a source of light to give sharply-defined light impulses at said frequency, utilizing said impulses to illuminate a stroboscopic device, and varying the speed of said device until a pattern thereon appears stationary.

15. That method of determining the pitch of sounds which comprises converting sound vibrations into a varying alternating electric current of the same frequency, converting said current into a current of constant effective amplitude with the same frequency, suppressing one half of each wave of said second current, utilizing the constant-amplitude intermittent current at said frequency so formed to energize a source of light to give sharply-defined light impulses at said frequency, utilizing said impulses to illuminate a stroboscopic device provided with a pattern and driven at a known speed corresponding to a known frequency, varying said speed until the pattern appears stationary, and determining the variation in speed and determining said frequency by the variation from said known frequency.

16. That method of determining the pitch of sounds which comprises converting sound vibrations into a varying alternating electric current of the same frequency, converting said current into a current of constant effective amplitude with the same frequency, utilizing the current at said frequency so formed to energize a source of light to give light impulses at said frequency, utilizing said impulses to illuminate a stroboscopic device provided with a pattern and driven at a known speed corresponding to a known frequency, varying said speed until the pattern appears stationary, and determining the variation in speed and determining said frequency by the variation from said known frequency.

17. That method of determining the pitch of sounds which comprises converting sound vibrations into alternating electric current of the same frequency, suppressing one half of each wave of said current to give an intermittent current at said frequency, energizing a source of light to form a series of light impulses at said frequency under the control of said intermittent current, and illuminating a stroboscopic device with said impulses and utilizing said device to determine said frequency.

18. That method of determining the pitch of sounds which comprises converting sound vibrations into a varying electric current of constant effective amplitude and having a synchronized frequency, energizing a source of light to form a series of light impulses of constant intensity at said frequency under the control of said current, and determining the frequency of said impulses.

19. Apparatus of the class described comprising, in combination with a light having connected thereto means for energizing the light intermittently at a definite frequency, a patterned stroboscopic disk, means for driving said disk at a frequency approximating synchronization with said definite frequency of the light so that the pattern on said disk will appear stationary if the two frequencies are synchronized and will appear to turn if they are not, a second and variable driving means, differential means connecting the two driving means to said disk and which includes a normally stationary part which moves in proportion to the effect of the variable driving means on said disk, and an indicator operated by said part.

20. Apparatus of the class described comprising, in combination with a light having connected thereto means for energizing the light intermittently at a definite frequency, a patterned stroboscopic member, means for driving said member at a frequency approximating synchronization with said definite frequency of the light so that the pattern will appear stationary if the two frequencies are synchronized and will appear to turn if they are not, means for varying the speed at which said member is driven by said means through a narrow range above and below its normal speed, and an indicator operated by said speed-varying means.

21. Apparatus of the class described comprising microphonic means for converting a musical tone into a variable electric current having the same frequency as said tone, volume control means for converting said current into an alternating current of uniform effective amplitude at said frequency, means for suppressing one half of each wave of said alternating current to form an intermittent current having equal-intensity impulses at said frequency, a source of light energized intermittently at said frequency with impulses of uniform intensity under the control of said electric impulses, and means for determining stroboscopically the frequency of said light impulses.

22. Apparatus of the class described comprising microphonic means for converting a musical tone into an alternating electric current having the same frequency as said tone, means for suppressing one half of each wave of said alternating current to form an intermittent current having impulses at said frequency, a source of light energized intermittently at said frequency under the control of said electric impulses, and means for determining stroboscopically the frequency of said light impulses.

23. Apparatus of the class described comprising microphonic means for converting a musical sound into an electric current varying with the same frequency as said sound and with its variations of amplitudes corresponding to the volume of said sound, volume control means converting said current into a current varying with the same frequency but with variations of uniform effective amplitude, means for energizing a source of light intermittently to form a series of light impulses of uniform strength under the control of said second current, and means for determining the frequency of said series of light impulses.

ORA L. RAILSBACK.